US012779950B2

(12) United States Patent
Cherchi

(10) Patent No.: US 12,779,950 B2
(45) Date of Patent: Nov. 3, 2026

(54) METHOD FOR OPERATING A REFRIGERANT CIRCUIT OF A MOTOR VEHICLE, AND MOTOR VEHICLE

(71) Applicant: AUDI AG, Ingolstadt (DE)

(72) Inventor: Julian Cherchi, Pollenfeld (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 18/706,516

(22) PCT Filed: Sep. 13, 2022

(86) PCT No.: PCT/EP2022/075423

§ 371 (c)(1),
(2) Date: May 1, 2024

(87) PCT Pub. No.: WO2023/104363

PCT Pub. Date: Jun. 15, 2023

(65) Prior Publication Data

US 2026/0158869 A1 Jun. 11, 2026

(30) Foreign Application Priority Data

Dec. 6, 2021 (DE) ..................... 10 2021 132 039.9

(51) Int. Cl.
*B60H 1/32* (2006.01)
*B60H 1/00* (2006.01)

(52) U.S. Cl.
CPC ....... *B60H 1/3213* (2013.01); *B60H 1/00907* (2013.01); *B60H 1/323* (2013.01); (Continued)

(58) Field of Classification Search
CPC .. B60H 1/3213; B60H 1/00907; B60H 1/323; B60H 2001/3258; B60H 2001/3285; B60H 1/00507; B60H 1/00021
See application file for complete search history.

(56) References Cited

U.S. PATENT DOCUMENTS

2021/0268868 A1* 9/2021 Rebinger ................ F25B 49/02

FOREIGN PATENT DOCUMENTS

DE 19644583 A1 4/1998
DE 10301006 A1 7/2003
(Continued)

OTHER PUBLICATIONS

Examination Report issued on Jul. 27, 2022, in corresponding German Application No. 102021132039.9, 12 pages.
(Continued)

*Primary Examiner* — Frantz F Jules
*Assistant Examiner* — Martha Tadesse
(74) *Attorney, Agent, or Firm* — Maier & Maier, PLLC

(57) ABSTRACT

A method for operating a refrigerant circuit of a motor vehicle, with a compressor which, in a heating mode of the refrigerant circuit, conveys a refrigerant through a first condenser, by which an air flow is heated. The compressor conveys the refrigerant through a second condenser for further cooling. At least a partial flow of the refrigerant coming from the second condenser is expanded by a first expansion member and supplied to a first evaporator, by which a humidity of the air flow can be reduced. To increase the heating power available at the first condenser, a further partial flow of the refrigerant is expanded by a second expansion member and supplied to a second evaporator. The refrigerant coming from the evaporators is supplied to a suction side of the compressor.

15 Claims, 2 Drawing Sheets

(52) U.S. Cl.
CPC ................ *B60H 2001/3258* (2013.01); *B60H 2001/3285* (2013.01)

(56) References Cited

FOREIGN PATENT DOCUMENTS

| | | | | | |
|---|---|---|---|---|---|
| DE | 102009056027 | A1 | | 4/2011 | |
| DE | 102013021360 | A1 | | 6/2015 | |
| DE | 102018213232 | A1 | | 2/2020 | |
| DE | 102019121711 | A1 | | 2/2020 | |
| DE | 102019203292 | A1 | * | 9/2020 | ................ F25B 5/02 |
| DE | 102019212503 | A1 | | 2/2021 | |
| DE | 102019133488 | A1 | | 6/2021 | |
| DE | 102019133546 | A1 | | 6/2021 | |
| WO | WO-2020030556 | A1 | * | 2/2020 | .............. F25B 49/02 |

OTHER PUBLICATIONS

International Preliminary Report on Patentability issued on Jun. 5, 2024, in corresponding International Application No. PCT/EP2022/075423, 17 pages.

* cited by examiner

METHOD FOR OPERATING A REFRIGERANT CIRCUIT OF A MOTOR VEHICLE, AND MOTOR VEHICLE

FIELD

The invention relates to a method for operating a refrigerant circuit of a motor vehicle. The refrigerant circuit comprises a compressor which, in a heating mode of the refrigerant circuit, conveys a refrigerant through a first condenser. By means of the first condenser, an air flow that can be introduced into a passenger compartment of the motor vehicle is heated. In heating mode, the compressor conveys the refrigerant through a second condenser, by means of which the refrigerant can be further cooled. At least a partial flow of the refrigerant coming from the second condenser is expanded by means of a first expansion member and supplied to a first evaporator. By means of the first evaporator, the humidity of the air flow introduced into the passenger compartment of the motor vehicle can be reduced. Furthermore, the invention relates to a motor vehicle with a refrigerant circuit.

BACKGROUND

DE 10 2018 213 232 A1 describes methods for operating a refrigeration system of a vehicle with a refrigerant circuit having a heat pump function. In a post-heating operation, in the event of excess heat, in addition to heat being released to the supply air of a passenger compartment via an internal heating condenser, heat is also released to the environment of the vehicle via an external heat exchanger before the refrigerant flows back to a refrigerant compressor via an evaporator. For this purpose, a post-heating expansion member upstream of the external heat exchanger is fully opened, wherein the pressure level of the refrigerant assumes the pressure level of the heating condenser. The refrigerant is then expanded to low pressure in the evaporator using an expansion valve.

DE 10 2019 133 488 A1 describes another post-heating method for operating a refrigeration system for a motor vehicle.

DE 10 2019 121 711 A1 describes a thermal management system for an electrified vehicle.

DE 10 2009 056 027 A1 describes a method for operating a refrigerant circuit of a vehicle air conditioning system.

SUMMARY

The object of the present invention is to provide a method of the type mentioned at the outset, which is accompanied by an improved heating operation, and to provide a motor vehicle with a control device designed to carry out the method.

In the method according to the invention for operating a refrigerant circuit of a motor vehicle, a compressor conveys a refrigerant through a first condenser in a heating mode of the refrigerant circuit. By means of the first condenser, an air flow that can be introduced into a passenger compartment of the motor vehicle is heated. In heating mode, the compressor conveys the refrigerant through a second condenser, by means of which the refrigerant can be further cooled. At least a partial flow of the refrigerant coming from the second condenser is expanded by means of a first expansion member and supplied to a first evaporator. By means of the first evaporator, the humidity of the air flow introduced into the passenger compartment of the motor vehicle can be reduced.

In order to increase the heating power available at the first condenser, a further partial flow of the refrigerant coming from the second condenser is expanded by means of a second expansion member and supplied to a second evaporator. The refrigerant coming from the evaporators is supplied to a suction side of the compressor.

This method is based on the knowledge that by subjecting the second evaporator to the expanded further partial flow of the refrigerant, additional heat can be introduced into the refrigerant very easily and quickly. This is because the refrigerant flowing through the second evaporator can absorb heat from a cooling medium which can be supplied to the second evaporator. As a result, the flow of refrigerant through the second condenser does not need to be prevented in order to increase the heating power available at the first condenser. This is advantageous in view of a stable heating operation of the refrigerant circuit. Consequently, the method is accompanied by improved heating operation.

The first condenser, which is operated as a gas cooler in the heating mode of the refrigerant circuit and can also be referred to as a heater, can very efficiently provide warm air for the interior or passenger compartment by the first condenser heating the air flow that can be introduced into the passenger compartment of the motor vehicle. And by expanding the refrigerant at the first expansion member, a particularly efficient, in particular energy-efficient, dehumidification of the air flow that can be introduced into the passenger compartment of the motor vehicle can be achieved.

The method can therefore be used to increase the efficiency of air conditioning in the passenger compartment or interior and to achieve broad availability. In particular, efficient air conditioning of the passenger compartment can be ensured at ambient air temperatures of approximately 15° C. to approximately 35° C. In particular, if the compressor is designed as an electrically driven refrigerant compressor, the consumption of electrical power from an electrical energy storage of the motor vehicle can be advantageously minimized. If the electrical energy storage also provides electrical energy for a drive device of the motor vehicle, for example because the motor vehicle is designed as an electric vehicle or hybrid vehicle, the range of the motor vehicle can be increased accordingly.

By dividing the heating power provided at the first condenser and the second condenser, a good and comfortable mix ratio of warm air and fresh air or ambient air can be freely selected via appropriate air conditioning control. This is because the required heating power to be provided by the first condenser can be provided very precisely. This is because there is no need to set a mix ratio of cold air and ambient air or fresh air.

By supplying the second evaporator with the additional partial flow of the refrigerant coming from the second condenser, a temporary deficit in heating power available at the first condenser can in particular be compensated very easily. Such a deficit may occur, for example, if an occupant of the passenger compartment desires a greater heating of the air flow that can be heated by means of the first condenser and the occupant accordingly actuates a control device of an air conditioning system of the motor vehicle comprising the refrigerant circuit.

Furthermore, by supplying the second evaporator with the additional partial flow, it is possible to react very quickly and with little effort to a situation in which there is a reduction, in particular a short-term or temporary reduction, in the amount of heat or energy present in the refrigerant circuit.

Such a situation can also be advantageously responded to quickly and with little effort by adding the second evaporator.

A temporary deficit in heating power available at the first condenser can be caused, for example, by the fact that no precisely specified or exactly desired amount of heating power is dissipated at the second condenser, which can be arranged in particular in the region of a front end of the motor vehicle and can therefore also be referred to as a front-end condenser. Rather, the case may arise that the additional integration of the second condenser or front-end condenser into the refrigerant circuit results in a certain minimum removal of heat from the refrigerant at the second condenser during heating operation of the refrigerant circuit. Therefore, even in such a situation, it is advantageous if a temporary or transient deficit of heating power available at the first condenser is balanced or compensated for by supplying the second evaporator with the further partial flow of expanded refrigerant.

Furthermore, the amount of heat dissipated at the second condenser depends on a number of other factors, such as the air mass which is supplied to the second condenser and the temperature of this air mass, which is usually provided by ambient air. If the second condenser or front-end condenser is supplied with an air mass flow by means of a fan of the motor vehicle, the intensity of the air mass flow may also depend on whether the front-end condenser comprises a further heat exchanger which is supplied with air for cooling purposes.

Such factors may also contribute to a greater heat dissipation at the second condenser than is desirable in view of the dissipation of excess heating power regarding the first condenser. And this greater heat dissipation can be compensated by supplying the second evaporator with the additional partial flow of refrigerant.

It is advantageous if the front-end condenser or second condenser remains integrated into the refrigerant circuit in heating mode, i.e. is flowed through by the refrigerant which the compressor initially conveys through the first condenser in the form of the heater. This is because removing or disconnecting the second condenser from the refrigerant circuit during heating operation requires complex re-adjustment of the refrigerant circuit and of the heating operation. This is unfortunate and can be avoided in this case.

In addition, preventing the flow through the second condenser can lead to undesirable temperature fluctuations at the first evaporator. And if, after the second condenser has been disconnected from the refrigerant circuit, the refrigerant in the second condenser is sucked out by means of the compressor, this also entails a corresponding amount of effort. Such disturbances in the heating operation of the refrigerant circuit can be prevented to a particularly large extent in this case because no frequent circuit changes are made in which the second condenser is decoupled from the refrigerant circuit.

The second expansion member connected upstream of the second evaporator, which is designed in particular as a so-called chiller, serves in particular to temporarily compensate for a heating output deficit at the first condenser or heater. By appropriately controlling this second expansion member, in particular a change from a connection of the refrigerant circuit in which excess heat is dissipated via the second condenser to a connection of the refrigerant circuit in which flow through the second condenser is prevented can be avoided in an advantageous manner.

Avoiding frequent circuit changes and corresponding debouncing is therefore advantageous with regard to the improved heating operation achievable by means of the method.

In particular, the second expansion member can be regulated to a target outlet temperature of the air flow exiting from the first condenser or heater and which can be introduced into the passenger compartment of the motor vehicle or a corresponding condensation temperature of the first condenser can be regulated in order to increase the heating power available in the refrigerant circuit.

Preferably, the second evaporator is designed as a chiller which absorbs heat from a coolant flow. In this case, a particularly large amount of heat can be introduced into the refrigerant particularly quickly at the second evaporator. This is because a liquid coolant, especially one containing water, has a comparatively high heat capacity.

Preferably, in order to debounce and thus avoid frequent circuit changes, the amount of heat that can be absorbed from the coolant flow at the second evaporator or chiller is taken into account. On the one hand, the temperature of the coolant flow and the period of time during which heat transfer from the coolant flow to the refrigerant takes place play a role in this case. In particular, by specifying threshold values with regard to the amount of heat that can be absorbed from the coolant flow, frequent decoupling of the second condenser or front-end condenser from the refrigerant circuit during heating operation can be avoided.

Preferably, before the second evaporator is supplied with the further partial flow, a flow-through cross section of a throttle device is first reduced in order to increase the heating power available at the first condenser. In the flow direction of the refrigerant through the refrigerant circuit in heating mode, the throttle device is arranged downstream of the first condenser and upstream of the second condenser. This is based on the knowledge that by reducing the flow-through cross section of the throttle device, the pressure of the refrigerant in the region of the first condenser and thus also the temperature of the refrigerant in the region of the first condenser can be increased. In an analogous manner, the heating power available at the first condenser can be reduced by increasing or enlarging the flow-through cross section of the throttle device. In this way, a distribution of the heat quantities to be respectively dissipated at the first condenser or heater and the second condenser or front-end condenser can be set very easily and quickly.

In particular, the throttle device can be designed as an expansion valve connected downstream of the heater or first condenser, by means of which valve a target outlet temperature, i.e. a target temperature of the air flow downstream of the first condenser or heater, or a condensation temperature at the first condenser or heater can be set or regulated.

In particular, if the flow-through cross section of the throttle device is initially reduced in order to increase the heating power available at the first condenser before the second partial flow of the refrigerant is even supplied to the second evaporator, a very uniform heating operation of the refrigerant circuit can be achieved.

Preferably, a target value of a temperature of the first condenser, up to which the throttle device remains open, is set to a higher value than a target value of the temperature of the first condenser, upon which the second expansion member is opened. In this way, it can be ensured in particular that the second expansion member remains closed in a stationary heating operation of the refrigerant circuit as long as the first condenser provides sufficient heating power to reach the target temperature. This is advantageous in view of a stable heating operation of the refrigerant circuit.

Preferably, the flow-through cross section of the throttle device is adjusted as a function of a target value of a temperature to which the air flow is to be heated by means of the first condenser. In this way, a corresponding heating request can be taken into account very easily, which can be specified, for example, by an occupant of the vehicle in the passenger compartment.

The throttle device can preferably be moved into a blocking position in which flow through the second condenser is prevented. The throttle device is preferably only moved into the blocking position when a predetermined heating output cannot be provided neither by reducing the flow-through cross section of the throttle device nor by subsequently subjecting the second evaporator to the further partial flow of the refrigerant at the first condenser. This ensures that the second condenser only becomes disconnected or separated from the refrigerant circuit relatively rarely. This is also advantageous in terms of ensuring that the refrigerant circuit operates as smoothly and evenly as possible.

Preferably, an opening width of the first expansion member is adjusted depending on the further cooling of the refrigerant, which can be effected by means of the second condenser. If the opening width of the first expansion member is small, the refrigerant in the second condenser will cool down more than if the opening width of the first expansion member is larger. Consequently, the further cooling of the refrigerant can be adjusted in a very targeted manner. This is advantageous for efficient dehumidification of the air flow supplied to the passenger compartment or interior of the motor vehicle.

Furthermore, in this way, in particular, subcooling of the already condensed refrigerant in the second condenser can be achieved. A control target of such subcooling can be based in particular on the level of the total condenser load or condenser power and thus be a function of this condenser load. A range of values within which the control target can vary can in particular be between 4 K and 12 K.

Preferably, in order to adjust an air mass flow acting on the second condenser, an amount of heat dissipated from the refrigerant at the first condenser and a difference between a temperature of the refrigerant at an inlet to the second condenser and a temperature of the ambient air are taken into account. In this way, it is possible to determine very precisely how large the air mass flow applied to the second condenser, in particular the front-end condenser, should be. In particular, excess power loss can be determined very precisely, which should be dissipated at the second condenser.

Furthermore, the air mass flow to be set to dissipate the excess power loss or the excess heating can be easily calculated and set. The total amount of heat to be dissipated via the first condenser and the second condenser can, for example, be calculated from the sum of the outputs of the evaporators and the output of the compressor. In this case, it can be approximately assumed that if the compressor is designed as an electric refrigerant compressor, the electrical output of the compressor essentially corresponds to the amount of heat introduced into the refrigerant by means of the compressor or due to the operation of the compressor. And the respective evaporator capacity is the amount of heat that is absorbed by the refrigerant at the respective evaporator. This total amount of heat in the form of the sum of the output of the evaporator and the output of the compressor is therefore present in the refrigerant circuit. If the heating power that is delivered to the air flow at the first condenser or heater is subtracted from this total amount of heat, the power to be dissipated at the second condenser or front-end condenser can be easily determined.

The amount of heat or power to be dissipated by means of the second condenser or front-end condenser can be converted into a target air mass flow using a characteristic map specific to the second condenser. In such a characteristic map, in particular the difference between the temperature of the refrigerant at the inlet to the second condenser and the temperature of the ambient air can be taken into account.

The target air mass flow to be supplied to the second condenser can be provided in particular by controlling a fan associated with the second condenser and/or by opening a shutter or radiator shutter associated with this condenser. Accordingly, by increasing the speed of the fan or by further opening the radiator shutters, a certain air mass flow can be provided, which is then applied to the second condenser. If there is no shutter or radiator shutter on a radiator that includes the second condenser, the desired air mass flow can be set simply by adjusting the speed of the fan associated with the second condenser.

Preferably, to determine a surplus and/or a deficit of heating power available at the first condenser, a temperature and a mass air flow supplied to the first condenser, a heating of the air flow to be brought about by the first condenser and an amount of heat introduced into the refrigerant circuit are taken into account. In this way, a possible excess of heating power available at the first condenser or a possible deficit of heating power can be determined in a very simple and precise manner.

This is based on the knowledge that power can be calculated and balanced in the refrigerant circuit, wherein the physical relationship:

$$Q_p = mf * cp * \Delta T$$

can be used, where: $Q_p$=heat output, mf=air mass, cp=heat capacity of the air and ΔT=difference in the temperature of the air mass or the air flow at the inlet and outlet of the first evaporator.

In some cases, measured actual power values can be used, wherein input variables from temperature sensors can be used to determine the temperature difference ΔT. Furthermore, required target power values can be taken into account. In particular, a mixed calculation can be carried out in which measured values from a temperature sensor and a heating or cooling request can be used to calculate a temperature difference. These target power values are to be provided in particular by the heat exchangers in the form of the first evaporator and the first condenser or heater in order to appropriately condition the air flow to be introduced into the passenger compartment.

If, in heating mode, excess heating or an oversupply is detected at the first condenser serving as a heater, the second condenser can be connected in series with the first condenser as an additional heat sink and can accordingly be flowed through by the refrigerant which the compressor conveys through the refrigerant circuit. Such an oversupply can occur if the amount of heat in the refrigerant circuit or introduced into the refrigerant circuit is greater than the amount of heat that is dissipated to the air flow at the first condenser serving as a heat sink. In this case, the heating requirement is essentially exceeded.

The amount of heat to be absorbed by the air flow at the first condenser or heater can be determined from the heating request and the air mass (mf) provided to the first condenser when the air flow to be introduced into the passenger compartment of the motor vehicle flows through the first condenser. The strength of the air flow can be specified in particular by a control device, for example in the form of an air conditioning control unit of the motor vehicle, which controls a fan associated with the first condenser. The energy introduced into the refrigerant circuit and thus contained in the refrigerant circuit can be determined by adding up the amount of heat absorbed at the first evaporator and the power of the compressor.

The control signal output by the air conditioning control unit for controlling the fan can be set in particular by an occupant of the passenger compartment via a corresponding control device of the motor vehicle.

Preferably, in the heating mode, actuation of at least one valve device of the refrigerant circuit ensures that an entire mass flow of the refrigerant conveyed by the compressor flows at least through the first condenser. This contributes to efficient heating operation. At least one multi-way valve can be used as a valve device. Additionally or alternatively, the valve device can be provided by shut-off valves which ensure that in the heating mode the entire mass flow of the refrigerant delivered by the compressor is supplied to the first condenser.

Preferably, in the heating mode, a direct fluidic coupling of the first condenser and the second condenser with the suction side of the compressor is prevented. Such a connection of the first condenser and/or the second condenser to the suction side of the compressor may be useful for operating modes of the refrigerant circuit other than heating mode. In heating operation, however, preventing the direct fluidic coupling of the first condenser and the second condenser with the suction side of the compressor ensures that the refrigerant flows through the first evaporator or flows through the first evaporator and the second evaporator in parallel before the expanded refrigerant reaches the suction side of the compressor. This is advantageous for undisturbed operation of the refrigerant circuit.

Preferably, in the heating mode of operation, a pressure present on the suction side of the compressor and a temperature of the air flow downstream of the first evaporator are taken into account for adjusting a delivery capacity of the compressor. In this way, a desired reduction in the humidity of the air flow that can be introduced into the passenger compartment of the motor vehicle can be achieved very efficiently.

In particular, a cascade control can be implemented in which the suction pressure of the compressor is controlled in an inner control circuit and the temperature of the air flow downstream of the first evaporator is controlled in an outer control circuit. In particular, such a cascade control or control cascade can ensure that a suction pressure to be set to reduce the humidity of the air flow is reliably achieved. This is based on the knowledge that with the preferred cascade control, the inner control loop is very fast, i.e. it can be adjusted very quickly, while the temperature of the air flow is controlled more slowly.

For example, by increasing the speed of the compressor, the pressure on the suction side of the compressor can be reduced and the temperature of the air flow downstream of the first evaporator can be reduced.

The motor vehicle according to the invention has a refrigerant circuit which comprises a compressor. By means of the compressor, a refrigerant can be conveyed through a first condenser of the refrigerant circuit in a heating operation of the refrigerant circuit. By means of the first condenser an air flow to be introduced into the passenger compartment of the motor vehicle can be heated. By means of the compressor, the refrigerant can be conveyed in the heating mode through a second condenser of the refrigerant circuit, wherein a further cooling of the refrigerant can be effected by means of the second condenser. At least a partial flow of the refrigerant coming from the second condenser can be expanded by means of a first expansion member of the refrigerant circuit and supplied to a first evaporator of the refrigerant circuit. By means of the first evaporator, the humidity of the air flow introduced into the passenger compartment of the motor vehicle can be reduced. The control device of the motor vehicle is designed to cause a further partial flow of the refrigerant coming from the second condenser to be expanded by means of a second expansion member of the refrigerant circuit in order to increase the heating power available at the first condenser. Furthermore, the control device is designed to cause the further partial flow to be supplied to a second evaporator of the refrigerant circuit. The refrigerant coming from the evaporators can be conveyed to a suction side of the compressor.

In the motor vehicle, an improved heating operation of the refrigerant circuit can thus be realized, because the control device is designed to operate the refrigerant circuit according to the method according to the invention or an embodiment thereof.

The control device for the motor vehicle is also part of the invention. The control device can have a data processing device or a processor device which is designed to perform an embodiment of the method according to the invention. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the method according to the invention when it is executed by the processor device. The program code can be stored in a data memory of the processor device.

The advantages and preferred embodiments described for the method according to the invention also apply to the motor vehicle according to the invention and vice versa.

The invention also includes developments of the motor vehicle according to the invention, which have features as already described in the context of the developments of the method according to the invention. For this reason, the corresponding developments of the motor vehicle according to the invention are not described again here.

The motor vehicle according to the invention is preferably designed as an automobile, in particular as a passenger car or truck, or as a passenger bus.

The invention also comprises the combinations of the features of the described embodiments. The invention therefore also comprises implementations that respectively have a combination of the features of several of the described embodiments, provided that the embodiments have not been described as mutually exclusive.

BRIEF DESCRIPTION OF THE FIGURES

Exemplary embodiments of the invention are described hereinafter. In particular.

DETAILED DESCRIPTION

Figure 1:
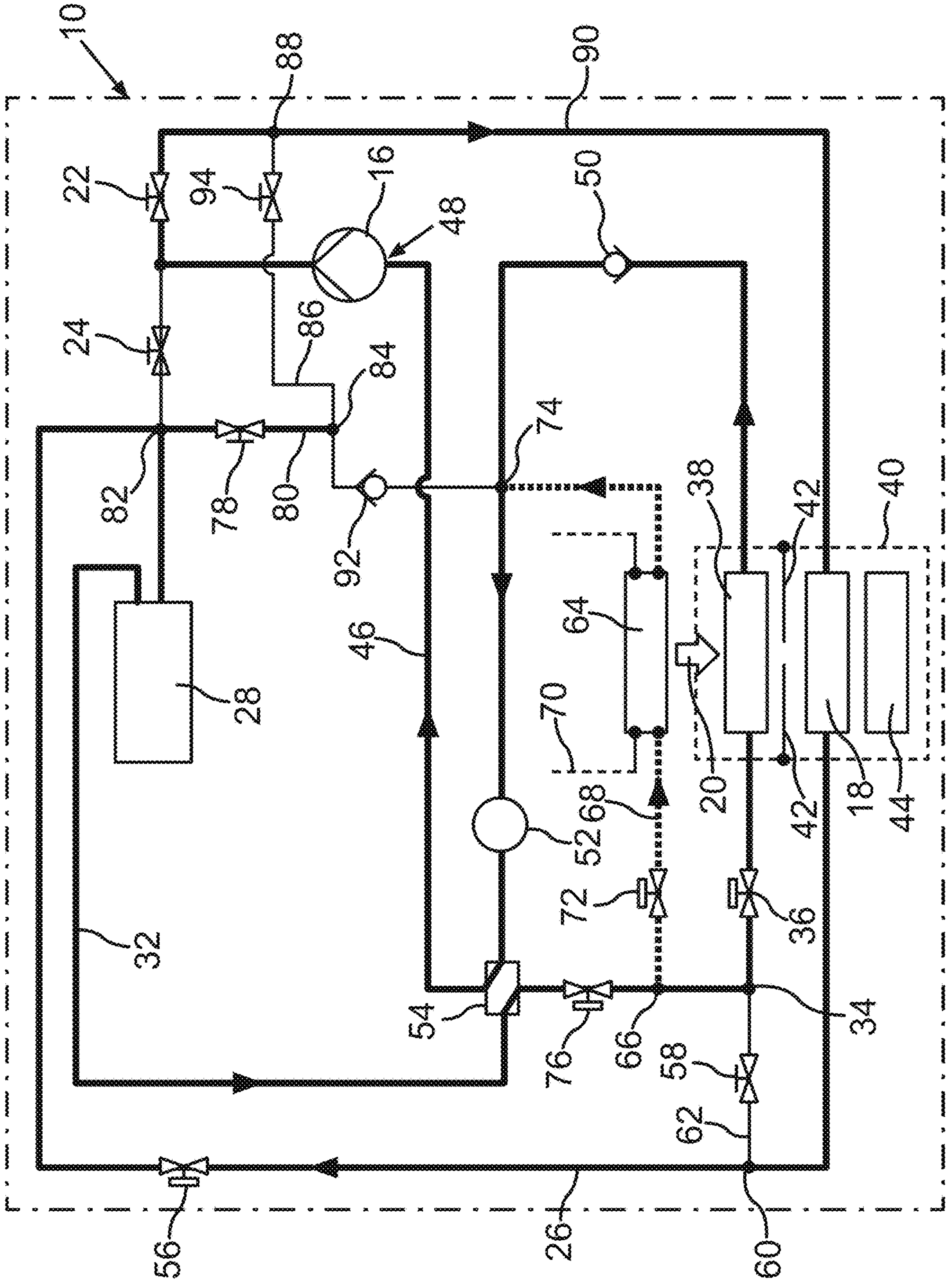
FIG. 1 schematically shows a refrigerant circuit of a motor vehicle which can be operated in a heating mode.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, the same reference numerals respectively designate elements that have the same function.

Figure 2:
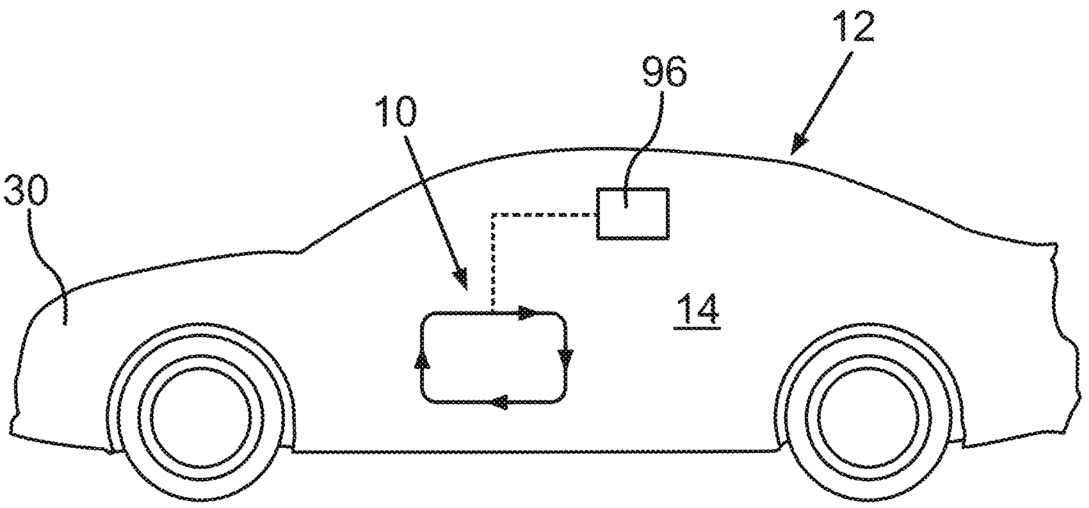
FIG. 2 shows a highly schematic representation of the motor vehicle having the refrigerant circuit.

FIG. 1 shows a schematic representation of a refrigerant circuit 10 of a motor vehicle 12, which is also shown in highly schematic form in FIG. 2. The refrigerant circuit 10 can be used, on the one hand, in an air conditioning system operation in which cooled ambient air is introduced into a passenger compartment 14 of the motor vehicle 12 (see FIG. 2) in a manner known per se. For an explanation of such air conditioning operation of the refrigerant circuit 10, reference is made to the aforementioned DE 10 2018 213 232 A1.

In the following, a heating operation of the refrigerant circuit 10 will be explained, which differs from the air conditioning operation of the refrigerant circuit 10. In this heating operation, a compressor 16 of the refrigerant circuit 10 initially conveys the compressed refrigerant to a first condenser 18 of the refrigerant circuit 10. The first condenser 18 functions as a gas cooler and can also be referred to as a heater. When an air flow 20 that can be introduced into the passenger compartment 14 of the motor vehicle 12 (see FIG. 2) flows over the first condenser 18 through which the compressed refrigerant flows, heat is given off to the air flow 20 and consequently the air flow 20 is heated. Consequently, in the heating operation of the refrigerant circuit 10, the first condenser 18 is used as a heat source for the air flow 20 which is introduced into the passenger compartment 14 of the motor vehicle 12.

In order to cause a flow of the refrigerant from a high-pressure side of the compressor 16 to the first condenser 18 in the heating operation, a first shut-off valve 22 can be opened and a second shut-off valve 24 can be closed. The shut-off valves 22, 24 shown here as examples can be components of a valve device of the refrigerant circuit 10.

In heating mode, the refrigerant flows from the first condenser 18 via a line branch 26 of the refrigerant circuit 10 to a second condenser 28 of the refrigerant circuit 10, which is connected in series to the first condenser 18 in the heating mode. The second condenser 28 can be arranged in particular in the region of a front end 30 of the motor vehicle 12 (see FIG. 2) and can therefore also be referred to as a front-end condenser. In the second condenser 28, a further cooling of the refrigerant takes place due to the exposure of the latter to ambient air. In heating mode, the refrigerant flows via an outlet line 32 connected to the second condenser 28 to a branching point 34 of the refrigerant circuit 10. From the branching point 34, the refrigerant passes via a first expansion member 36, which is designed, for example, as an expansion valve, to a first evaporator 38 of the refrigerant circuit 10.

The refrigerant expanded by means of the first expansion member 36 absorbs heat from the air flow 20 in the first evaporator 38 and thereby ensures a reduction in the humidity of the air flow 20 that can be introduced into the passenger compartment 14 of the motor vehicle 12. The first evaporator 38 can therefore also be referred to as an interior evaporator in the present case.

An input variable for cooling the air flow 20 at the first evaporator 38 or interior evaporator can be in the range of about 3° C. to about 15° C. in order to condense moisture contained in the air flow 20 and thus reduce the humidity of the air flow 20. Viewed in the flow direction of the air flow 20 through an air conditioning unit 40 of the motor vehicle 12, the first condenser 18 serving as a heater can be arranged downstream of the first evaporator 38 or interior evaporator (see FIG. 1).

For example, by means of schematically shown air flaps 42, which in the present case are arranged in the flow direction of the air flow 20 between the first evaporator 38 and the first condenser 18, a proportion of the amount of air to be introduced into the passenger compartment 14 can be adjusted, which is to be reheated via the first condenser 18 serving as a heater. Here, a required heating request can have a value between, for example, 20° C. and 60° C. as a functional input variable.

A further heating device 44 can be arranged in the air conditioning unit 40, which can be designed, for example, as an additional electric heater. Such an additional electric heater can be provided in particular if the motor vehicle 12 is designed as an electric vehicle or hybrid vehicle, wherein the electric heating device 44 is supplied by an electrical energy storage of the motor vehicle 12, which provides electrical energy for a drive motor used for driving the motor vehicle 12.

In particular, when the motor vehicle 12 is designed as an electric vehicle or hybrid vehicle, the compressor 16 can be designed as an electric refrigerant compressor the speed of which can be regulated.

In heating mode, the expanded refrigerant coming from the first evaporator 38 is supplied back to a suction side 48 of the compressor 16 via a return line 46.

As shown in FIG. 1, a check valve 50 and/or a manifold 52 may be arranged in the return line 46. Furthermore, the efficiency of the refrigerant circuit 10 can be improved by means of an (optional) internal heat exchanger 54.

In the present case, a throttle device 56 is arranged in the line branch 26 downstream of the first condenser 18 and upstream of the second condenser 28, when viewed in the flow direction of the refrigerant through the refrigerant circuit 10 in heating operation. A flow-through cross section of the throttle device 56, which can be designed as an expansion valve, for example, can be reduced in order to increase a heating power of the refrigerant circuit 10 available at the first condenser 18 in the heating mode. This is because if the pressure of the refrigerant in the line branch 26 upstream of the throttle device 56 and thus also in the region of the first condenser 18 is higher than downstream of the throttle device 56 in the line branch 26, the temperature of the refrigerant flowing through the first condenser 18 is also higher.

In a corresponding manner, a greater opening of the throttle device 56 and thus an increase in the flow-through cross section of the throttle device 56 ensures a reduction in the temperature of the first condenser 18. Accordingly, a load distribution between the first condenser 18 and the second condenser 28 can be carried out by controlling the throttle device 56. This load distribution can therefore be used to influence the amount of heat that is dissipated at the first condenser 18 and the second condenser 28.

It may happen that, despite a comparatively large reduction in the flow cross-section of the throttle device 56, the first condenser 18 does not provide the desired heating output. In this case, in principle, the throttle device 56 can be completely closed and, in contrast, a shut-off valve 58 can be opened, which is arranged in a line 62 that leads from a branch point 60 arranged upstream of the throttle device 56 in the line branch 26 to branch point 34. Then, however, the refrigerant delivered by the compressor 16 no longer flows first through the first condenser 18 and then through the second condenser 28. Rather, the refrigerant coming from the first condenser 18 is supplied directly to the first evaporator 38 via the first expansion member 36.

Such a change in the circuit is unfavorable in the heating operation of the refrigerant circuit 10 and can be essentially avoided in the present case. Even if a particularly temporary or transient deficit in heating power occurs at the first condenser 18, the refrigerant can still flow through the second condenser 28. For this purpose, in the heating mode of the refrigerant circuit 10, the amount of heat present in the refrigerant circuit 10 can be increased by adding a second evaporator 64.

In the present case, a further line branch 68 of the refrigerant circuit 10 branches off from the outlet line 32 at a further branch point 66. The second evaporator 64 is arranged in this line branch 68 and in this case is designed as a so-called chiller. Accordingly, this second evaporator 64 serves to cool a coolant flow.

In FIG. 1, a corresponding section of a coolant circuit 70 of the motor vehicle 12 through which the coolant flows is indicated schematically. In other words, the second evaporator 64 absorbs heat from the coolant flow that flows through the coolant circuit 70. In this way, heat is introduced into the refrigerant, which is returned to the suction side 48 of the compressor 16 after flowing through the second evaporator 64.

In the line branch 68, a second expansion member 72 is arranged, which is connected upstream of the second evaporator 64 in the flow direction of the refrigerant. By means of the second expansion member 72, the refrigerant flowing into the second evaporator 64 is expanded. The second expansion member 72 can in particular be designed as an expansion valve.

When the second expansion member 72 is opened, the entire mass flow of the refrigerant coming from the second condenser 28 no longer flows through the first evaporator 38. Rather, a first partial flow of the refrigerant coming from the second condenser 28 flows through the first evaporator 38 and a second partial flow flows parallel thereto through the second evaporator 64. At a junction point 74, the line branch 68 enters the return line 46 downstream of the second evaporator 64. Accordingly, in this operating state of the refrigerant circuit 10, the refrigerant coming from the two evaporators 38, 64 is supplied to the suction side 48 of the compressor 16.

The second expansion member 72 can be opened in particular when a temporary deficit of heat at the first condenser 18 is to be compensated due to an increase in the heating requirement or due to a reduction in the amount of energy or heat in the refrigerant circuit 10.

By adding the second evaporator 64, in which the second evaporator 64 is also flowed through by refrigerant in the heating mode of the refrigerant circuit 10, namely by the second partial flow of the refrigerant, it can be avoided that a frequent circuit change occurs. In the case of the particularly largely avoidable change in the interconnection of the refrigerant circuit 10, the second condenser 28 is disconnected or decoupled from the refrigerant circuit 10 by completely closing the throttle device 56 and opening the shut-off valve 58.

Threshold values can be specified which indicate a removal rate on the one hand and a removal time on the other. The removal capacity describes the amount of heat that is absorbed from the cooling water or coolant flow when the second partial flow of the refrigerant flows through the second evaporator 64 which is exposed to the coolant flow. And the removal time indicates how long such absorption of heat from the coolant flow or cooling water flow through the second evaporator 64 takes place. If corresponding threshold values are exceeded, it can be provided that the interconnection of the refrigerant circuit 10 described with reference to FIG. 1 is changed. Thus, in particular in the case of a larger and/or longer-lasting heat deficit at the first condenser 18, a change can be made to a circuit, in which the second condenser 28 is disconnected or flow through the second condenser 28 is prevented.

If an (optional) expansion valve 76 shown in FIG. 1 is present in the outlet line 32 of the refrigerant circuit 10, which in this case is connected upstream of the further or second branch point 66, the throttle device 56 on the one hand and the expansion valve 76 on the other hand can be closed in order to disconnect or decouple the second condenser 28. Additionally or alternatively, a shut-off valve 78 of the refrigerant circuit 10 can be moved into a closed position, which valve is arranged in a connecting line 80 in the present case.

In the present case, the connecting line 80 connects a branching point 82 arranged in the line branch 26 upstream of the second condenser 28 with a further branching point 84. The second or further branching point 84 is in turn located in a line branch 86 which leads from the inlet point 74 to a further inlet point 88.

The further inlet point 88 is located in the present case in a further line branch 90 of the refrigerant circuit 10, which leads from the pressure side of the compressor 16 to the first condenser 18 and is flowed through by the refrigerant supplied by the compressor 16 when the first shut-off valve 22 is open. In the line branch 86, between the inlet point 74 and the branch point 84, there is a check valve 92 which can be pressed open when refrigerant flows through the connecting line 80. Furthermore, in the present case, a further shut-off valve 94 is arranged in the line branch 86 between branch point 84 and inlet point 88. The shut-off valves 78, 94, like the first shut-off valve 22 and the second shut-off valve 24, can be components of the valve device of the refrigerant circuit 10.

The line routings and the like described above can deviate in variants of the refrigerant circuit 10 from the arrangement of the respective valves, line branches, connecting lines, branching points, inlet points and the like which were explained by way of example. In heating mode, the way the refrigerant delivered by the compressor 16 is supplied to the first condenser 18 exclusively via the line branch 90 can be different from the illustrated example.

In the present case, the second condenser 28 is preferably used in the heating mode of operation of the refrigerant circuit 10 when a heating request is exceeded at the first condenser 18 or heater or the amount of energy or heat introduced into the refrigerant circuit 10 is greater than the amount of heat which is to be released to the air flow 20 at the first condenser 18. In the event of such an excessive supply, excess heat can be released into the ambient air at the second condenser 28 or front-end condenser.

The motor vehicle 12 with the refrigerant circuit 10 and a control device 96 is shown schematically in FIG. 2. The control device 96 serves to control the different components of the refrigerant circuit 10 so that the functionalities of the refrigerant circuit 10 explained above can be carried out.

Overall, the examples show how load distribution can be provided in the refrigerant circuit 10 with dual condensers in the form of the first condenser 18 and the second condenser 28.

The invention claimed is:

1. A method comprising:

conveying, in a heating mode of a refrigerant circuit, a refrigerant through a first condenser, thereby heating an air flow introduced into a passenger compartment of a motor vehicle;

conveying, in the heating mode, with a compressor, the refrigerant through a second condenser;

expanding a first partial flow of the refrigerant coming from the second condenser by a first expansion valve supplying the first partial flow to a first evaporator, thereby reducing a humidity of the air flow introduced into the passenger compartment of the motor vehicle expanding a second partial flow of the refrigerant coming from the second condenser by a second expansion valve;

supplying the second partial flow to a second evaporator, wherein the second partial flow in the second evaporator flows parallel to the first partial flow in the first evaporator and a flow-through cross section of a third expansion valve is reduced, as a function of a target value of a temperature, before supplying the second partial flow to the second evaporator; and supplying the refrigerant coming from the first evaporator and the second evaporator to a suction side of the compressor.

2. The method according to claim 1, wherein the third expansion valve is arranged downstream of the first condenser and upstream of the second condenser relative to the flow direction of the refrigerant through the refrigerant circuit when in heating mode.

3. The method according to claim 2, wherein a target value of a temperature of the first condenser, up to which the third expansion valve remains open, is set to a higher value, at which the second expansion valve is opened.

4. The method according to claim 2, further comprising:

bringing the third expansion valve into a blocking position in which flow through the second condenser is prevented if a predetermined heating output can neither be provided by reducing the flow-through cross section of the third expansion valve nor by subsequently applying the second partial flow of the refrigerant to the second evaporator at the first condenser.

5. The method according to claim 1, further comprising:

adjusting an opening width of the first expansion valve depending on subcooling of the refrigerant, brought about by the second condenser.

6. The method according to claim 1, further comprising:

adjusting an air mass flow through the second condenser based upon both an amount of heat removed from the refrigerant at the first condenser and a difference between a temperature of the refrigerant at an inlet to the second condenser and a temperature of the ambient air.

7. The method according to claim 1, further comprising:

determining a heating power available at the first condenser based upon a temperature and a mass of air flow supplied to the first condenser, a heating of the air flow to be brought about by the first condenser and an amount of heat introduced into the refrigerant circuit.

8. The method according to claim 1, further comprising:

adjusting a delivery capacity of the compressor based upon both a pressure present on the suction side of the compressor and a temperature of the air flow downstream of the first evaporator.

9. A motor vehicle comprising:

a refrigerant circuit which comprises a compressor wherein:

in a heating mode of the refrigerant circuit, a refrigerant is conveyed through a first condenser of the refrigerant circuit, thereby heating, by the first condenser, an air flow introduced into a passenger compartment of the motor vehicle, by the compressor, the refrigerant is conveyed through a second condenser of the refrigerant circuit in the heating mode, a first partial flow of the refrigerant coming from the second condenser is expanded by a first expansion valve of the refrigerant circuit the first partial flow is supplied to a first evaporator of the refrigerant circuit, thereby reducing a humidity of the air flow introduced into the passenger compartment of the motor vehicle, a second partial flow of the refrigerant coming from the second condenser is expanded by a second expansion valve of the refrigerant circuit;

the second partial flow is supplied to a second evaporator of the refrigerant circuit in order to increase a heating power available at the first condenser, wherein the second partial flow in the second evaporator flows parallel to the first partial flow in the first evaporator and a flow-through cross section of a third expansion valve is reduced, as a function of a target value of a temperature, before supplying the second partial flow to the second evaporator; and the refrigerant coming from the first evaporator and the second evaporator is supplied to a suction side of the compressor.

10. The method according to claim 3, wherein the third expansion valve is brought into a blocking position in which flow through the second condenser is prevented if a predetermined heating output can neither be provided by reducing the flow-through cross section of the third expansion valve nor by subsequently applying the second partial flow of the refrigerant to the second evaporator at the first condenser.

11. The method according to claim 2, wherein an opening width of the first expansion valve is adjusted depending on subcooling, of the refrigerant brought about by the second condenser.

12. The method according to claim 3, wherein an opening width of the first expansion valve is adjusted depending on subcooling, of the refrigerant brought about by the second condenser.

13. The method according to claim 4, wherein an opening width of the first expansion valve is adjusted depending on subcooling, of the refrigerant brought about by the second condenser.

14. The method according to claim 2, further comprising:

adjusting an air mass flow through the second condenser based upon an amount of heat removed from the refrigerant at the first condenser and a difference between a temperature of the refrigerant at an inlet to the second condenser and a temperature of the ambient air.

15. The method according to claim 3, further comprising: adjusting an air mass flow through the second condenser based upon an amount of heat removed from the refrigerant at the first condenser and a difference between a temperature of the refrigerant at an inlet to the second condenser and a temperature of the ambient air.

* * * * *